United States Patent
LeMense (12) 
(10) Patent No.: US 6,266,592 B1
(45) Date of Patent: Jul. 24, 2001

(54) APPARATUS AND METHOD FOR SENSING A REARWARD FACING CHILD SEAT USING BEAT FREQUENCY DETECTION

(75) Inventor: Thomas John LeMense, Livonia, MI (US)

(73) Assignee: TRW Inc., Lyndhurst, OH (US)

( * ) Notice: Subject to any disclaimer, the term of this patent is extended or adjusted under 35 U.S.C. 154(b) by 395 days.

(21) Appl. No.: 08/730,674

(22) Filed: Oct. 11, 1996

(51) Int. Cl.⁷ .............................. G06F 7/00; G06F 17/00
(52) U.S. Cl. .................... 701/45; 180/271; 180/272; 280/734; 280/735; 340/903
(58) Field of Search .................. 701/45, 49; 280/734, 280/735; 180/273, 272, 271; 340/436, 903; 307/10.1; 342/72, 107

(56) References Cited

U.S. PATENT DOCUMENTS

| | | | |
|---|---|---|---|
| 4,063,229 | 12/1977 | Welsh et al. | 340/571 |
| 4,342,998 | * 8/1982 | Easter | 342/202 |
| 4,644,286 | 2/1987 | Torre | 340/572 |
| 5,285,194 | 2/1994 | Ferguson | 340/572 |
| 5,349,332 | 9/1994 | Ferguson et al. | 340/572 |
| 5,482,314 | * 1/1996 | Corrado et al. | 280/735 |
| 5,605,348 | * 2/1997 | Blackburn et al. | 280/735 |
| 5,631,555 | * 5/1997 | Takahashi et al. | 324/96 |
| 5,653,462 | * 8/1997 | Breed et al. | 280/735 |

* cited by examiner

Primary Examiner—William A. Cuchlinski, Jr.
Assistant Examiner—Gertrude Arthur
(74) Attorney, Agent, or Firm—Tarolli, Sundheim, Covell, Tummino & Szabo L.L.P.

(57) ABSTRACT

An apparatus (52) senses the presence of a rearward facing child restraint seat (34) in a vehicle. Signal generating components (80, 84 and 90) of a driver/receiver circuit (64) provide an electrical transmit signal, at a first frequency, which is applied to an antenna (60) during a first time period. The antenna (60) transmits an electromagnetic (EM) signal (62) at the first frequency during the first time period. At the end of the first time period, the EM transmit signal (62) is terminated. During a second time period, a component (84) of the driver/receiver circuit (64) provides a signal at a second, different frequency. An identification tag (54) is securable to the child restraint seat (34) and provides an EM return signal (68) in response to the EM transmit signal (62). The EM return signal (68) has the same frequency as the EM transmit signal (62) and continues past the termination of the EM transmit signal into the second time period. The antenna (60) receives the EM return signal (68) and provides an electrical return signal in response to the EM return signal. A mixer (122) is coupled to receive both the second frequency signal and the electrical return signal in the second time period, and provides a beat frequency signal. The presence and duration of the best frequency signal is indicative of the presence of the identification tag (54).

20 Claims, 4 Drawing Sheets

APPARATUS AND METHOD FOR SENSING A REARWARD FACING CHILD SEAT USING BEAT FREQUENCY DETECTION

TECHNICAL FIELD

The present invention is directed to a vehicle occupant restraint system and is specifically directed to an apparatus and method for sensing the presence of a rearward facing child restraint seat on a vehicle seat of a vehicle and preventing deployment of an air bag restraint.

BACKGROUND OF THE INVENTION

Air bag restraint systems for vehicles are well known in the art. It is also known to prevent deployment of an air bag during a vehicle collision when the air bag is associated with a seat location that is unoccupied. Deployment of an air bag associated with an unoccupied seat location (typically the passenger seat location) during a vehicle collision adds unnecessary expense to the repair of the vehicle.

To prevent such unnecessary deployment of an air bag at an unoccupied seat location, sensors are provided to detect the presence of an occupant on a vehicle seat. These sensors include pressure sensing switches located in the seat cushion and/or infrared or ultrasonic sensors located in the vehicle dashboard or instrument panel. If no occupant is detected as being present on the seat, deployment of the associated air bag during a vehicle collision is prevented through an appropriate control arrangement.

It is also desirable to prevent deployment of an air bag when a child restraint seat is secured in a rearward facing direction on the vehicle seat associated with the air bag.

SUMMARY OF THE INVENTION

The present invention provides an apparatus and method for sensing the presence of an object and, in particular, a rearward facing child restraint seat.

Transmitter means of the apparatus provides a transmitted electromagnetic signal. Receiver means receives an electromagnetic return signal. Identifier means, securable to the object, provides the electromagnetic return signal at a first frequency in response to the transmitted electromagnetic signal. Second signal means provides a signal at a second frequency different from the first frequency. Combiner means mixes signals which have the first frequency from the return signal and the second frequency to provide a beat signal having a beat frequency. Processor means coupled to receive the beat signal determines the presence of the identifier means when a predetermined beat frequency is received and provides a signal indicative thereof.

In accordance with one embodiment of the present invention, the transmitter means includes signal provider means for providing a first electrical signal having the one frequency for a first time period and a second electrical signal having the second frequency for a second, different time period. The transmitter means and the receiver means include antenna means. The transmitted electromagnetic signal is transmitted by the antenna means in response to the electrical signal having the one frequency for the first time period. The processor means determines the presence of the identifier means when the beat signal from the combiner means has the predetermined frequency for at least a predetermined duration.

The method includes securing an identifier means to the object and transmitting an electromagnetic signal. The identifier means provides an electromagnetic return signal in response to the transmitted electromagnetic signal. The electromagnetic identifier return signal has a first frequency. The electromagnetic identifier return signal is received by receiver means. A second signal is provided at a second frequency, which is different from the first frequency. Signals which have the two frequencies are mixed to provide a beat signal having a beat frequency. The beat signal is received and the presence of the identifier means is determined when the beat signal has a predetermined frequency. A signal indicative of the presence of the identifier means is provided.

BRIEF DESCRIPTION OF THE DRAWINGS

Further features and advantages of the present invention will become apparent to those skilled in the art to which the present invention relates from reading the following description with reference to the accompanying drawings, in which.

DESCRIPTION OF PREFERRED EMBODIMENT

Figure 1:
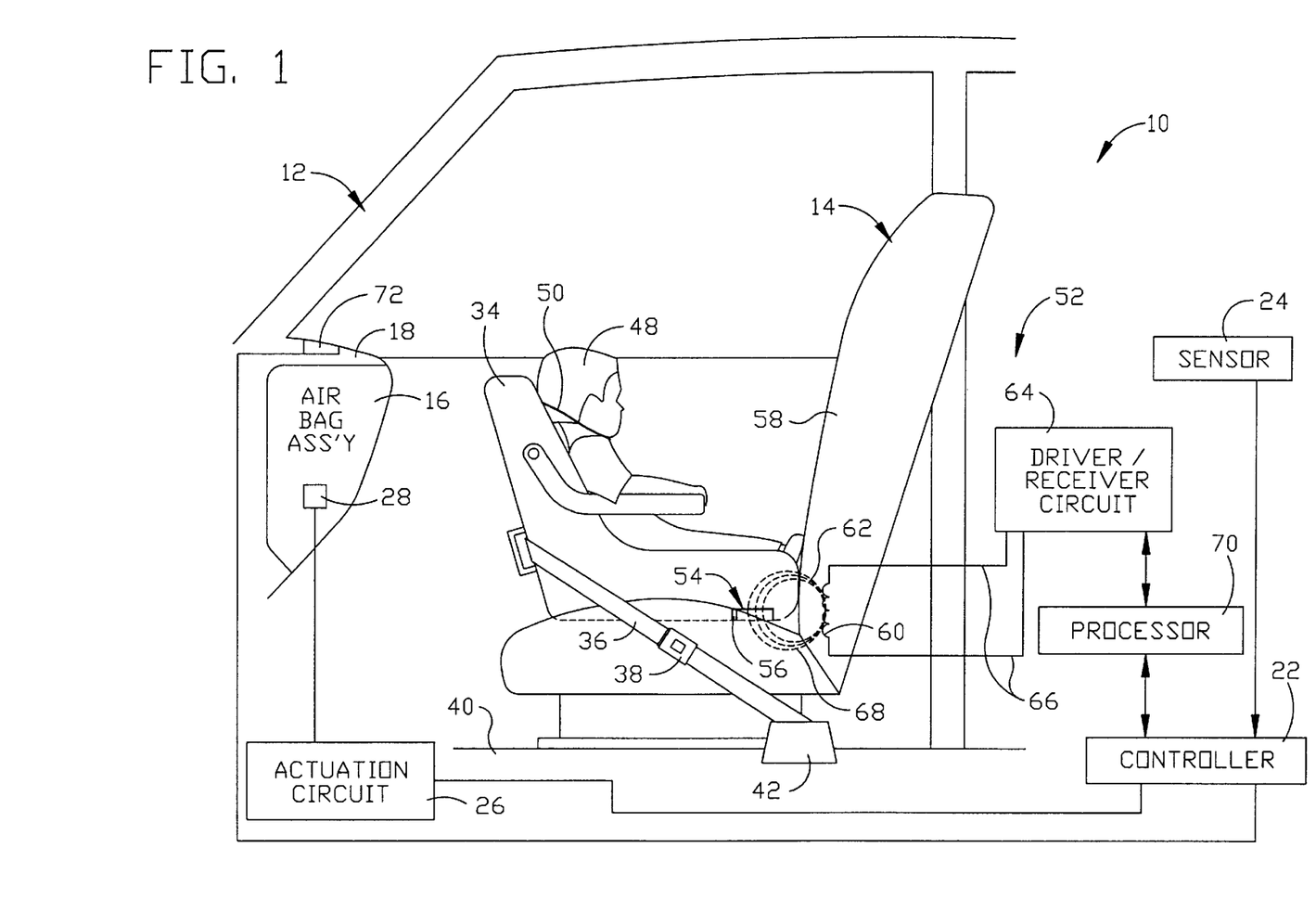
FIG. 1 is a schematic representation of an air bag restraint system including an apparatus made in accordance with the present invention.

An air bag restraint system 10 in a vehicle 12 is schematically shown in FIG. 1. The vehicle 12 includes a vehicle seat 14, which, for purposes of explanation, is a front passenger seat. An air bag assembly 16 is mounted in a dashboard 18 of the vehicle 12 in a manner well known in the art. An inflatable portion or air bag (not shown) of the air bag assembly 16 is inflated by means (not shown), such as an ignitable gas generating material and/or a container of pressurized gas, to extend into the occupant compartment of the vehicle 12 in front of the vehicle seat 14. The air bag assembly 16 may be any of several known air bag assemblies.

A controller 22 controls actuation of the air bag assembly 16 such that the air bag is inflated upon the occurrence of a condition indicative of a vehicle collision. A sensor 24 is mounted in the vehicle 12 and is operatively connected to the controller 22. The sensor 24 may be any of several known sensors, including an inertia switch or an accelerometer, that provide an electrical signal to the controller 22 upon the occurrence of a vehicle collision.

The controller 22 is controllably connected to an air bag actuation circuit 26. The air bag actuation circuit 26 is electrically connected to an activator 28 within the air bag assembly 16. The activator 28 may be any suitable mechanism for initiating the inflation of the air bag by an inflator of the air bag assembly 16. For example, the activator 28 may be a squib which is operatively coupled to the inflator.

During operation of the vehicle 12, the controller 22 monitors the signal provided by the sensor 24. When the controller 22 determines a vehicle collision is occurring, the controller 22 provides a signal to the actuation circuit 26 to energize the activator 28. Energization of the activator 28 causes inflation of the air bag of the air bag assembly 16.

A child restraint seat 34 is secured to the vehicle seat 14 in a rearward facing direction by use of the seat belt system associated with the vehicle seat 14. A lap belt 36 of the seat belt system is fastened to a buckle 38 secured to the vehicle floor 40 through an anchor assembly 42. The lap belt 36 is received in a belt holder 44 of the child restraint seat 34 and is secured to the vehicle floor 40 on the other side (not shown) through a retractor assembly (not shown), all well known in the art. A child 48 is secured in the child restraint seat 34 using an over-both-shoulders harness restraint 50, such as a three point harness restraint of the type where two over-the-shoulder belts fasten to a between-the-legs buckle. Such belt systems are typical for a child restraint seat.

An apparatus 52 of the air bag restraint system 10 effects operation of the controller 22 to prevent actuation of the air bag assembly 16 when the rearward facing child restraint seat 34 is secured on the vehicle seat 14. An identification tag 54 of the apparatus 52 is attached to the child restraint seat 34. The identification tag 54 is made of a highly permeable amorphous material that is reactive when subjected to an oscillating electromagnetic (hereinafter referred to as "EM") signal having a particular frequency. Preferably, the identification tag 54 also includes a permanent magnet portion 56 that biases the amorphous material at the "knee" of a "BH" curve of the amorphous material.

As is known by those skilled in the art, the "BH" curve of the amorphous material is a plot of the magnetic flux density B as a function of the magnetic field intensity H. The "knee" of the "BH" curve is the region of the curve where the amorphous material exhibits a non-linear permeability. As a result of its bias at the non-linear "knee" of its BH curve, the amorphous material of the identification tag 54 vibrates at a certain frequency when the material is placed in an EM field resulting from an oscillating EM signal where the EM field has at least a minimum field strength, i.e., the identification tag material is magneto-strictive in response to the stimulus of the EM signal. The frequency of the vibration of the amorphous material is referred to as the natural resonant frequency of the identification tag 54. In one preferred embodiment, the natural resonance frequency is 52.6 kHz. The amorphous material of the identification tag 54 has the ability to store energy from electromagnetic stimulation in a mechanical form and this ability causes the amorphous material to continue to vibrate for a period of time after the stimulating EM signal terminates.

Preferably, the identification tag 54 is secured to the child restraint seat 34 with adhesive or is molded into a plastic portion of the child restraint seat during the seat's manufacture. In accordance with the embodiment shown in FIG. 1, the identification tag 54 is secured to the child restraint seat 34 such that, when the child restraint seat is secured in the rearward facing position on the vehicle seat 14, the identification tag is relatively near to a back portion 58 of the vehicle seat 14.

The apparatus 52 further includes an antenna 60. The antenna 60 transmits an EM field or signal 62, hereinafter referred to as the EM transmit signal, which permeates the space surrounding the antenna 60. An electrical transmit signal is applied to the antenna 60 by a driver portion of a driver/receiver circuit 64 via electrical leads 66 to excite the antenna so as to transmit the EM transmit signal 62. The antenna 60 also receives any EM return signal permeating the space surrounding the antenna. An electrical return signal appearing across the leads 66 of the antenna 60 and "seen" by a receiver portion of the driver/receiver circuit 64 during transmission of the EM transmit signal is a combination of the electrical transmit signal and any EM return signals present at that time.

The amorphous material of the identification tag 54 vibrates when the identification tag is placed in the near field of the EM transmit signal 62 of the antenna 60. The vibrating material of the identification tag 54 provides an EM return signal 68 which permeates the space surrounding the identification tag. Since the strength of both the EM transmit signal 62 from the antenna 60 and the EM return signal 68 from the identification tag 54 diminishes quickly as a function of the distance from the identification tag or the antenna (e.g., at least as rapidly as the distance is squared and more so for larger wavelength signals), the distance between the antenna and the identification tag is important.

There are three possible cases of interaction between an identification tag and an antenna. The first case is when an identification tag is very near to an antenna. An EM transmit signal from the antenna has sufficient strength to excite the identification tag, and the identification tag stores sufficient energy to provide an EM return signal of sufficient strength to excite the antenna. Accordingly, the identification tag can be detected.

The second case is when an identification tag is somewhat near to an antenna. An EM transmit signal from the antenna has sufficient strength to excite the identification tag, but the identification tag does not store sufficient energy to provide an EM return signal of sufficient strength to excite the antenna. Accordingly, the identification tag cannot be detected.

The third case is when an identification tag is distant from an antenna. An EM transmit signal from the antenna does not excite the identification tag, and the identification tag does not provide an EM return signal. The identification tag cannot be detected.

Accordingly, the identification tag 54 is located on the child restraint seat 34 and the antenna 60 is located within the vehicle 12, e.g., within the back portion 58 of the vehicle seat 14, such that very little distance separates the identification tag from the antenna when the child restraint seat is located in the rearward facing position on vehicle seat 14. Specifically, the distance between the identification tag 54 and the antenna 60 must be less than a predetermined distance to ensure that the EM transmit signal 62 transmitted by the antenna is strong enough to cause vibration of the identification tag and storage of sufficient energy by the identification tag to provide the EM return signal 68. It is to be understood that the location of the identification tag 54 on the child restraint seat 34 and the location of the antenna 60 may be changed so long as the position of the antenna remains relatively near to the identification tag when the child restraint seat is in the rearward facing position on the vehicle seat 14. Further, it is to be understood that the antenna 60 may be located elsewhere within the vehicle 12 other than within the vehicle seat 14 as long as the relative distance factor between the antenna and tag is observed for detection of a rearward facing child restraint seat. Also, the positions of the antenna 60 and identification tag 54 are such that, if the child restraint seat 34 were secured on the seat 14 in a forward facing direction, the signal strength from the antenna 60 would not effect a reaction from the identification tag.

The driver/receiver circuit 64 is operatively connected to a processor 70. The driver/receiver circuit 64 provides the electrical transmit signal to the antenna 60 via the leads 66 such that the antenna transmits the EM transmit signal 62. The driver/receiver circuit 64 also receives the electrical return signal from the antenna 60. The driver/receiver circuit 64 further provides an electrical signal to the processor 70 that contains information indicative of the presence or absence of the rearward facing child restraint seat 34. The processor 70 processes the information contained in the signal from the driver/receiver circuit 64 and determines whether a child restraint seat is present in the rearward facing position on the vehicle seat 14.

When the child restraint seat 34 is in the rearward facing position on the vehicle seat 14, i.e., the electrical return signal is provided in response to the EM return signal 68 from the identification tag 54, the processor 70 provides a rearward facing child seat presence indicating signal to the controller 22. In response to the rearward facing child seat presence indicating signal generated by the processor 70, the controller 22 prevents a "fire" signal from being output to the actuation circuit 26 so that the actuation circuit will not energize the activator 28 regardless of whether the sensor 24 provides a signal to the controller 22 indicative of a vehicle collision. Accordingly, the controller 22 prevents deployment of the inflatable portion of the air bag assembly 16 when the child restraint seat 34 is present and in the rearward facing position.

Also, the controller 22 may be controllably connected to a warning light 72 visibly mounted within the vehicle 12, such as on the dashboard 18. The warning light 72 is readily visible to an operator (not shown) of the vehicle 12. When the controller 22 prevents activation of the actuation circuit 26 such that the activator 28 cannot be energized, the controller also causes the warning light 72 to be illuminated to notify the vehicle operator that the air bag assembly 16 associated with the location of the rearward facing child restraint seat 34 has been disabled.

The driver/receiver circuit 64 (FIG. 2) includes an clock device 80 which provides a continuous oscillating electrical output signal on output line 82. In one preferred embodiment, the frequency of the output signal of the clock device 80 is 4 MHz.

Figure 2:
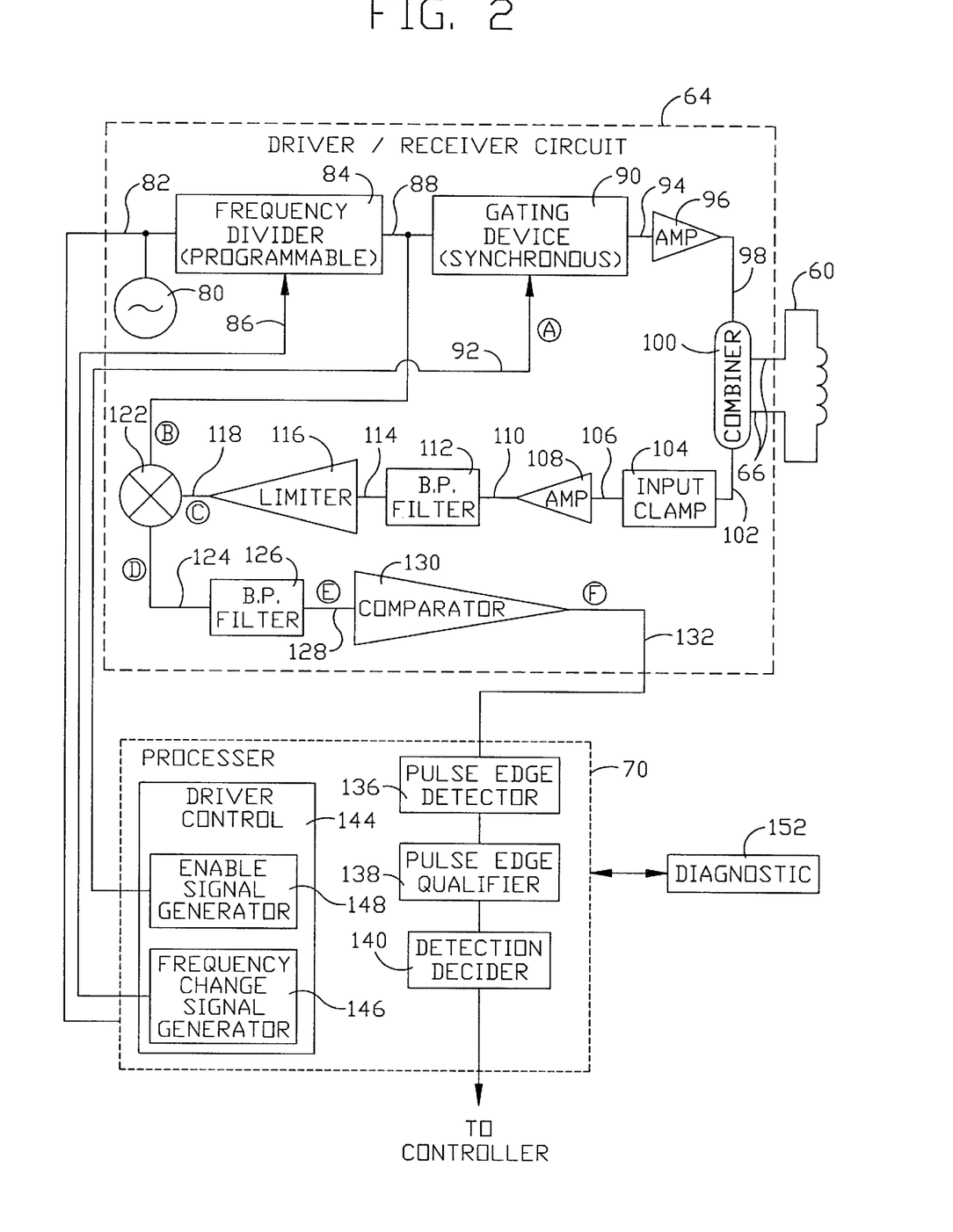
FIG. 2 is a schematic of the driver/receiver circuit and the processor circuit shown in FIG. 1.

A frequency divider 84 is connected to the line 82 and receives the output signal from the clock device 80. The frequency divider 84 divides the frequency of the output signal from the clock device 80 by an integer divisor and provides an output signal on line 88 with a frequency equal to the result of the division. In the preferred embodiment, the frequency divider 84 is programmable to select the integers for use as the divisor. Within the frequency divider 84, the integer divisor is changeable so that the frequency of the output signal from the frequency divider 84 can be selected to be either a first frequency or a second frequency. The frequency divider 84 selects the integer for the divisor, and hence the frequency of the output signal on line 88 from the frequency divider 84, in response to a frequency change signal provided to the frequency divider 84 on a line 86. Accordingly, the output signal from the frequency divider 84 has the first frequency for a first time period which ends when the frequency change signal is received and the output signal from the frequency divider has the second frequency for a second time period which begins when the frequency change signal is received.

The natural resonant frequency of the identification tag 54 is matched, or at least closely approximated, by the frequency divider 84 by dividing the frequency of the output signal from the clock device 80 by a certain integer. This matched frequency is the first frequency output from the frequency divider. In the preferred embodiment, an integer of seventy-six (76) is used as the divisor during the first portion of operation of the apparatus 52 such that the first frequency of the output signal from the frequency divider 84 is approximately 52.6 kHz (4 MHz÷76). This frequency is selected so as to be substantially the same as the natural resonant frequency (52.6 kHz in accordance with the preferred embodiment) of the amorphous material of the identification tag 54. Also, in the preferred embodiment, an integer of seventy (70) is used as the divisor during the second portion of operation of the apparatus 52 such that the second frequency of the output signal from the frequency divider 84 is approximately 57.1 kHz (4 MHz÷70). The difference between the first and second frequencies is 4.5 kHz.

An output line 88 from the frequency divider 84 is connected to an input of a gating device 90. The gating device 90 has pass and block states. In the pass state, the gating device 90 passes the output signal of the frequency divider 84 to the output terminal of the gating device. In the block state, the gating device does not pass the output signal from the frequency divider 84 but, instead, outputs a steady-state LOW signal. The gating device 96 is controlled in response to an enable signal on an enable input line 92.

Figure 3:
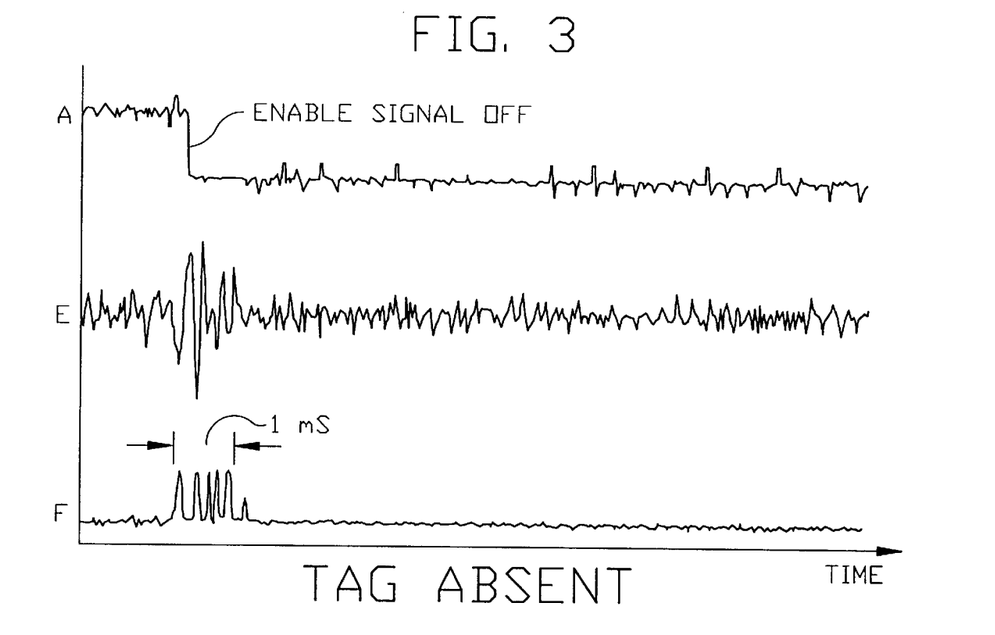
FIGS. 3 and 4 are graphical representations of signals at certain circuit locations shown in FIG. 2.
Figure 4:
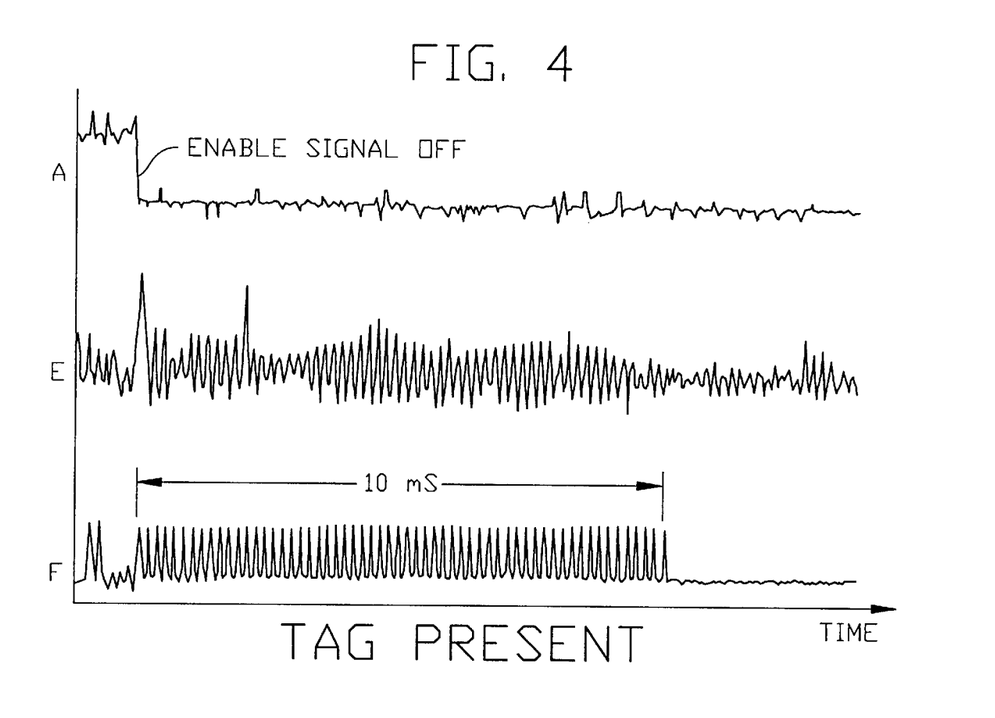

A HIGH signal on the enable line 92 results in the device 90 being in the pass state. A LOW on the enable line 92 drives the device 90 to a block state. Trace A in FIGS. 3 and 4 shows a gate control signal on line 92. When the gate control signal A is a relative HIGH, the gating device is in its pass state. When the enable signal drops to a relative LOW, the gating device 90 switches from its pass state to its block state.

The change in states of the enable signal on line 92 to the gating device 90 occurs simultaneously with the frequency change signal to the frequency divider 84 on line 86. Accordingly, during the first time period, the gating enable signal is HIGH and the output signal from the gating device 90 is an oscillating signal having the first frequency. When the gating enable signal drops LOW at the beginning of the second time period, the output signal from the gating device 90 is steady-state LOW, while the output signal of the frequency divider 84 on line 88 is at the second frequency.

An output line 94 of the gating device 90 is connected to an amplifier 96, and the output signal from the gating device is amplified. An output line 98 from the amplifier 96 is connected to a combiner circuit 100. The combiner circuit 100 is connected to the antenna 60 by the leads 66. The amplified oscillating signal from the gating device 90 is the electrical transmit signal. The combiner circuit 100 imposes the electrical transmit signal on the antenna 60, causing the antenna to transmit the EM transmit signal 62 with the same frequency as the output signal from the gating device 90, i.e, the first frequency which occurs during the first time period. The EM transmit signal 62 terminates when the gating enable signal on line 92 drops LOW and the gating device 90 switches to its blocking state.

The antenna 60 does "ring down" once the excitation from the electrical transmit signal ceases. The occurrence of "ring down" is well known in the art. The "ring down" of the antenna 60 is at the same frequency at which the antenna was being excited by the electrical transmit signal. Specifically, the antenna 60 "rings down" at the first frequency provided by the frequency divider 84. The "ringing down" of the antenna 60 is relatively quick due to the low Q factor of the antenna.

When the identification tag 54 is present in the space through which the EM transmit signal 62 (at the first frequency value) radiates with sufficient strength, the identification tag vibrates at the natural resonant frequency and provides the EM return signal 68 at its natural resonant frequency, i.e., the first frequency. When the EM transmit signal 62 terminates, the EM return signal 68 from the tag 54 continues for a certain amount of time because of the energy storage capability of the amorphous material.

The EM return signal 68 causes the antenna 60 to provide the electrical return signal on its leads 66. The electrical return signal resulting from the EM return signal 68 is at the first frequency value. The combiner circuit 100 extracts the electrical return signal and supplies this signal to an output line 102 of the combiner circuit. The output line 102 of the combiner circuit 100 is connected to an input clamp 104.

In addition to the electrical return signal which results from the EM return signal 68 from the tag 54, the electrical signal supplied to the input clamp 104 by the combiner circuit 100 further includes components due to "ring down" of the antenna 60, and any other stray EM signals received. Of course, the content of the signal supplied to the input clamp 104 varies over time. Because the circuitry at this point does not discriminate between signals from different origins, the collective signal received by the input clamp 104 is referred to herein as the electrical return signal.

The input clamp 104 limits the amplitude of the electrical return signal received on the line 102. For example, the input clamp 104 limits the voltage amplitude to 1.5 volt peak-to-peak. The input clamp 104 prevents relatively large amplitude signals such as the relatively large electrical output signal coming from the amplifier 96, and "seen" through the combiner circuit 100, from damaging electrical components within the driver/receiver circuit 64 that are "downstream" from the antenna 60 and combiner circuit 100. An output line 106 from the input clamp 104 is connected to an input of an intermediate frequency amplifier 108. The electrical return signal passing through the input clamp 104 is amplified by amplifier 108.

An output line 110 from the amplifier 108 is connected to an input of a band-pass filter 112. The band-pass filter 112 passes a narrow range of frequencies centered on the natural resonant frequency of the identification tag 54, i.e., the first frequency. In the preferred embodiment, the band-pass filter 112 is centered on 52.6 kHz. An output line 114 from the band-pass filter 112 is connected to an input of a limiter 116. The electrical return signal passing through the band-pass filter 112 is amplitude limited by limiter 116. Accordingly, the electrical return signal from the antenna 60 has been clamped, amplified, filtered and limited. The processed electrical return signal is output from the limiter 116 on an output line 118. For purposes of discussion, the processed electrical return signal which has been clamped, amplified, filtered and limited is still referred to as the electrical return signal because the signal characteristics of concern of the electrical return signal (i.e., frequency and duration) remain intact.

A mixer 122 has two inputs, one of which is connected to the output line 88 from the frequency divider 84 and the other of which is connected to the output line 118 from the limiter 116. The mixer 122 combines or mixes the electrical return signal with the output signal from the frequency divider 84. The product of the mixing within the mixer 122 is a resultant electrical signal which is provided to an output line 124 of the mixer 122.

The resultant electrical signal from the mixer 122 has frequency components from the output signal of the frequency divider 84 and from the electrical return signal. The mixer 122 combines the signals so that the resultant signal from the mixer 122 has two beat frequencies. One of the beat frequencies is functionally related to the sum of the frequencies of the output signal from the frequency divider 84 and the electrical return signal, and the other beat frequency is functionally related to the difference of the frequencies.

The output line 124 from the mixer 122 is connected to an input of a band-pass filter 126. The band-pass filter 126 passes a range of frequencies centered on the beat frequency which is the difference between the first and second frequencies. In the preferred embodiment, the bandpass filter 126 is centered on 4.5 kHz. The output line 128 of the band-pass filter 126 is connected to a comparator 130. The comparator 130 generates an electrical signal having a positive pulse (i.e., a switch from LOW to HIGH) for each oscillation in the output signal from the band-pass filter 126 which exceeds a predetermined amplitude value.

Within the driver/receiver circuit 64, during the first time period (i.e, when the gating device 90 is in the pass state and the output signal of the frequency divider 84 is at the first frequency), the electrical transmit signal is applied to the leads 66 of the antenna 60. The EM transmit signal 62 is generated and permeates around the antenna 60. Also, the electrical transmit signal is "seen" through the combiner circuit 100 by the input clamp 104.

The first input to the mixer 122 is the output signal from the frequency divider 84 at the first frequency. The second input to the mixer 122 is an electrical return signal derived from the electrical transmit signal "seen" through the combiner circuit 100. The frequency of the two input signals to the mixer 122 are the same (i.e., both are the first frequency). Accordingly, the resultant output signal provided by the mixer 122 does not contain a beat frequency component which is at, or even near, the range of frequencies which will pass through the band-pass filter 126.

The output signal from the band-pass filter 126 is at or near a steady-state LOW value, except for the occurrence of noise. The output signal from the band-pass filter 126 does not have sufficient amplitude to cause the comparator 130 to provide a pulse in the output signal from the comparator. Accordingly, the output signal from the comparator 130 remains LOW.

Figure 5:
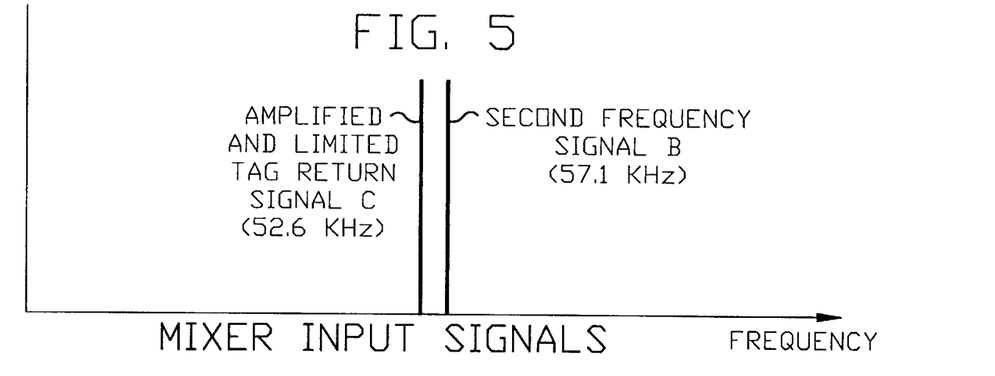
FIGS. 5–7 are graphical representations of frequency components present in signals at certain circuit locations shown in FIG. 2.
Figure 6:
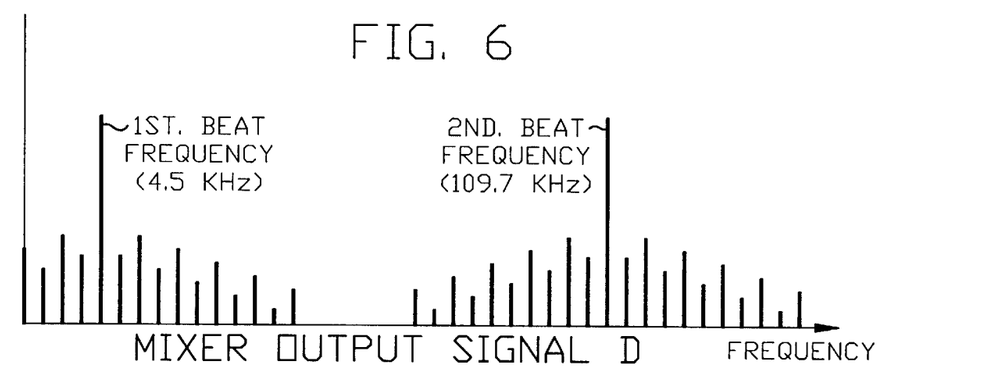
Figure 7:
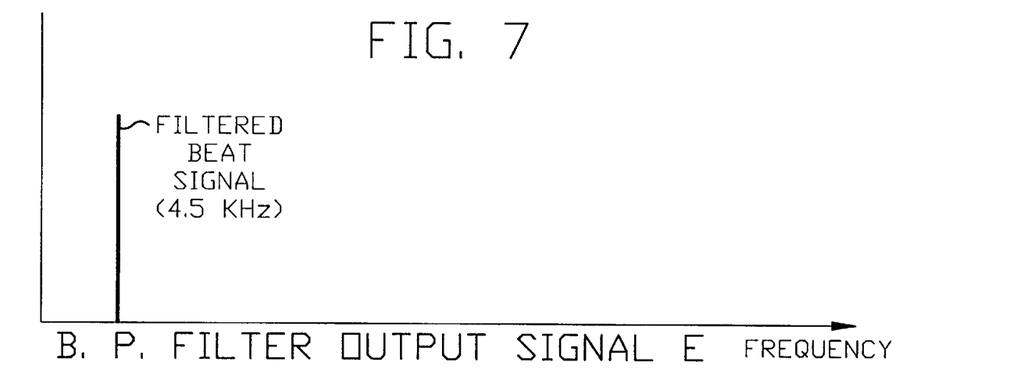

When the gating enable signal on the line 92 switches LOW and causes the gating device 90 to change to its blocking state and terminate its oscillating output signal (i.e., at the beginning of the second time period), the antenna 60 "rings down". The "ring down" effect of the antenna 60 is at the first frequency and is relatively short. At the same time, the frequency divider 84 switches to the second frequency, the first input to the mixer 122 is the output signal from the frequency divider at the second frequency which is shown in FIG. 5, signal representation B. It is to understood that the frequencies identified in FIGS. 5–7 are for the preferred embodiment. The second input (FIG. 5, signal representation C) to the mixer 122 (FIG. 2) is a return signal derived from (i) the "ring down" of the antenna 60 and, (ii) if the identification tag 54 is present, the EM return signal 68, both of which are at the second frequency. The two input signals (FIG. 5, representations B and C) to the mixer 122 have different frequencies (i.e., the first and the second frequencies) and the resultant output signal (FIG. 6, frequency spectrum representation D) from the mixer will contain a component at or near the beat frequency derived from the difference of the two frequencies. The band-pass filter 126 provides an output signal (FIGS. 3 and 4, trace E, and FIG. 7, representation E) at the beat frequency. The comparator 130 provides a pulsing output signal (FIGS. 3 and 4, trace F) which lasts for a duration dependent upon the duration of the beat frequency signal passing through the band-pass filter 126.

An output line 132 (FIG. 2) from the comparator 130 is connected to the processor 70. The processor 70 preferably includes a microcomputer. The processor 70 includes a pulse edge detector function 136. The pulse edge detector 136 reacts to a leading edge of each pulse in the output signal from the comparator 130 and provides a digital signal indicative of each pulse. The output signal from the pulse edge detector 136 is provided to a pulse edge qualifier function 138. The pulse edge qualifier 138 counts the number of pulse indications provided by the pulse edge detector 136. The pulse edge qualifier 138 is preset to determine if a predetermined number of pulses in the output signal from the comparator 130 is detected by the pulse edge detector 136 within a predetermined time period. The pulse edge qualifier 138 prevents further processing of the detected pulses in the output signal from the comparator 130 if at least the predetermined number of pulses within the predetermined time period does not occur. This minimum pulse count requirement serves to filter spurious pulses that may result from spurious EM signals received.

If the criteria within the pulse edge qualifier 138 is satisfied, the signal from the pulse edge detector 136 is provided to a detection decider function 140. The detection decider 140 counts the number of detected pulses in the output signal of the comparator 130 and determines if the number of detected pulses within a predetermined time period is within a predetermined numeric range. Thus, in one respect, the detection decider 140 performs a frequency measurement. In the preferred embodiment, the frequency measurement performed by the detection decider 140 "looks" for a frequency at or near 4.5 kHz. The duration of the pulsing output signal from the comparator 130 is related to the duration of the oscillating output signal from the band-pass filter 126. If an identification tag 54 is present, the pulsing output signal from the comparator 130 will last longer than the predetermined time period set within detection decider 140. If the number of detected pulses in the output signal from the comparator 130 within the predetermined time period is within the predetermined range and if the duration of the pulsing output signal from the comparator exceeds the predetermined time period, the detection decider 140 provides a signal (e.g., a HIGH) which indicates that the identification tag 54 is present. The output signal from the detection decider 140 (i.e., a tag is present or a tag is not present) is provided to the controller 22.

The processor 70 further includes a driver control 144 which has a frequency change signal generator 146 and a gating enable signal generator 148. The frequency change signal generator 146 provides the frequency change signal on the line 86 to the frequency divider 84. The gating enable signal generator 148 provides the gating enable signal on the line 92 to the gating device 90. The frequency change signal generator 146 is synchronized with the gating enable signal generator 148 such that gating enable signal and the frequency change signal switch, simultaneously. Also, driver control 144 is synchronized with other portions of the processor 70. A diagnostic control 152 is operatively connected with the processor 70 to enable error determination and to provide corrective measures if an error is detected within the processor.

Periodically, the driver control 144 causes the frequency change signal generator 146 and the gating enable signal generator 148 to switch states. When this occurs, the first time period ends and the second period begins. As should be understood, the second time period is an interrogation period, i.e., the apparatus 52 is "looking" for the identification tag 54. Also, periodically, the driver control 144 causes the frequency change signal generator 146 to switch again so as to result in the desired transmit signal at 88 and the enable signal generator 148 to again provide its HIGH enable signal. Thus, the cycle is repeated.

When the apparatus 52 is initiated (e.g., when the vehicle ignition is started), the sensor 24, the driver/receiver circuit 64, the processor 70, the controller 22, and the actuation circuit 26 all have initial states set (e.g., flags are set, memories are cleared). Specifically, within the driver/receiver circuit 64, the frequency divider 84 is set to provide its output signal with the first frequency and the gating device 90 is set to its pass state. Within the processor 70, the driver control 144 is set such that the frequency change signal is set to permit the first frequency at 88 and the enable signal is set HIGH. Also, the pulse edge detector 136, the pulse edge qualifier 138, and the detection decider 140 are cleared.

During operation, the clock device 80 provides its output signal to the frequency divider 84. During the first time period (i.e., prior to the switching of the frequency change signal to the frequency divider 84 and the switching of the enable signal to a LOW to the gating device 90), the frequency divider 84 provides its output signal with the first frequency to the gating device 90. The oscillating output signal of the gating device 90 is amplified and applied to the antenna 60 as the electrical transmit signal. The antenna 60 is excited at the first frequency and transmits the EM transmit signal 62. The input clamp 104 "sees" the electrical transmit signal, and the output signal from the input clamp is at the first frequency. Thus, the two signals which are input to the mixer 122 have the same frequency. The output signal of the mixer 122 does not include a beat frequency component which can pass through the band-pass filter 126. Accordingly, the output of the comparator 130 is at or near a steady state LOW value.

When the frequency change signal generator 146 switches states so that the frequency divider 84 and the gating enable signal generator 148 switch (FIGS. 3 and 4, trace A drop, i.e., when the first time period ends and the second time period begins), the electrical transmit signal from the gating device 90 ceases and so does the EM transmit signal 62. Also, the portion of the electrical return signal received by the input clamp 104 which is from the electrical transmit signal ceases.

If the child restraint seat 34 is not present in the rearward facing position on the vehicle seat 14, then the identification tag 54 is not located within a portion of the EM transmit signal 62 which has sufficient strength to cause the identification tag 54 to provide the EM return signal 68. The electrical return signal received by the input clamp 104 continues for a short time due to the "ring down" of the antenna 60. At the mixer 122, the first input is the output signal from the frequency divider 84 at the second frequency. The second input to the mixer 122 is the electrical return signal resulting from the "ring down" of the antenna 60, which is at the first frequency. Accordingly, for a short duration, the resultant output signal from the mixer 122 contains beat frequency components.

The band-pass filter 126 provides an output signal (FIG. 3, trace E) at the beat frequency of the difference in the two frequencies input to the mixer 122. The comparator 130 provides its output signal (FIG. 3, trace F) with a pulse for each oscillation of the output signal from the band-pass filter 126 above the amplitude threshold amount. However, because the duration "ring down" of the antenna 60 is relatively short, the oscillating output signal (FIG. 3, trace E) from the band-pass filter 126 and the pulsing output signal (FIG. 3, trace F) from the comparator 130 have relatively short durations (e.g., approximately 1 ms), and the pulsing output signal from the comparator 130 has relatively few pulses.

The pulses in the output signal (FIG. 3, trace F) from the comparator 130 are detected by the pulse edge detector 136 (FIG. 2) within the processor 70. The pulse edge qualifier 138 counts the number of detected pulses in the output signal of the comparator 130 and determines that further processing of the signal should occur. The detection decider 140 determines that the duration of pulsing output signal of the comparator 130 is less than the predetermined time period set within the detection decider (in the preferred embodiment, the predetermined time period is greater than 1 ms, but less than 10 ms.). Accordingly, the detection decider 140 determines that an identification tag 54 is not present during that cycle of the EM transmit signal 62. The detection decider 140 then outputs a signal which indicates that a child restraint seat 34 is not present in the rearward facing position on the vehicle seat 14. If a vehicle collision occurs, the controller 22 will control the actuation circuit 26 to cause actuation of the air bag assembly 16.

If the child restraint seat 34 is present in the rearward facing position on the vehicle seat 14, then the identification tag 54 is located within the EM transmit signal 62 so as to have sufficient strength to cause the identification tag to provide the return EM signal. The electrical return signal received by the input clamp 104 continues for a relatively long time due to the EM return signal 68 from the identification tag 54. Again at the mixer 122, the first input is at the second frequency and the second input resulting from the tag is at the first frequency. Accordingly, the resultant output signal from the mixer 122 contains beat frequency components.

The band-pass filter 126 provides an output signal (FIG. 4, trace E) at the beat frequency of the difference in the two frequencies input to the mixer 122. The comparator 130 provides its output signal (FIG. 4, trace F) with a pulse for each oscillation of the output signal from the band-pass filter 126 above the amplitude threshold amount. However, because the duration of the EM return signal 68 is relatively long (compared to the "ring down" of the antenna 60), the oscillating output signal (FIG. 4, trace E) from the band-pass filter 126 and the pulsing output signal (FIG. 4, trace F) from the comparator 130 have relatively long durations (e.g., approximately 10 ms), and the pulsing output signal from the comparator has many pulses.

The pulses in the output signal (FIG. 4, trace F) from the comparator 130 (FIG. 2) are detected by the pulse edge detector 136 within the processor 70. The pulse edge qualifier 138 counts the number of detected pulses in the output signal of the comparator 130 and determines that further processing of the signal should occur. The detection decider 140 determines that the criteria regarding frequency is satisfied (i.e., the number of pulse within the predetermined time period is within the predetermined range) and the duration of the pulsing output signal from the comparator 130 is greater than the predetermined time period. Accordingly, the detection decider 140 determines that the identification tag 54 is present. The detection decider 140 thus outputs a signal which indicates that a child restraint seat 34 is present in the rearward facing position on the vehicle seat 14. In response thereto, the controller 22 disables or prevents the actuation of the restraint 16 and actuates warning light 72. If a vehicle collision occurs, the air bag assembly 16 is not actuated. If the child seat is then removed from the seat 14, the next cycle of the apparatus 52 will restore enablement of the restraint 16 since the tag will no longer be sensed as being present. The driver control 144 cycles the frequency divider 84 and gating device 90 many times per second.

The diagnostic function 152 can be either internal to the processor 70 or controller 22 or can be external. The diagnostic functions 152 monitors (i) if no "ring down" is present, and/or (ii) is a return signal indicating a tag signal present for a time period longer than expected. If no ring is present, this indicates a possible antenna problem. If a return signal indicates a tag signal present for a time period longer than expected, this indicates a possible other source of EM return signal other than a tag. Upon the occurrence of either possible errors, the diagnostic function 152 would provide an error signal to processor 70 and/or controller 22. Since a fail-safe system is desired, actuation of the restraint 16 would be permitted and a warning (e,g., via. the warning light 72) given to alert the vehicle occupants.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for sensing the presence of an object, said apparatus comprising:
   transmitter means for providing a transmitted electromagnetic signal;
   receiver means for receiving an electromagnetic return signal;
   identifier means securable to the object for providing said electromagnetic return signal at a first frequency in response to said transmitted electromagnetic signal;
   second signal means for providing a signal at a second frequency, different from said first frequency;
   combiner means for mixing signals having said first frequency from said return signal and said second frequency to provide a beat signal having a beat frequency; and
   processor means coupled to receive said beat signal for determining the presence of said identifier means when a predetermined beat frequency is received and providing a signal indicative thereof.

2. An apparatus as set forth in claim 1 further including means to secure said identifier means to a child restraining seat.

3. An apparatus as set forth in claim 1, wherein said transmitter means includes signal provider means for providing an electrical signal having said first frequency for a first time period and an electrical signal having said second frequency for a second, different time period, said signal provider means being said second signal means.

4. An apparatus as set forth in claim 3, wherein said receiver means includes means for providing an electrical signal having said first frequency responsive to said electromagnetic return signal, and said combiner means includes means for mixing said electrical signal having said second frequency provided by said signal provider means and said electrical signal having said first frequency provided by said receiver means.

5. An apparatus as set forth in claim 4, wherein said beat signal provided by said combiner means exists for at least a predetermined duration.

6. An apparatus as set forth in claim 1, wherein said beat frequency is approximately equal to the difference between said first and second frequencies.

7. An apparatus as set forth in claim 1, wherein said beat signal provided by said combiner means has a duration longer than a predetermined time duration when said identifier means is present.

8. An apparatus as set forth in claim 1 further includes means for disabling an actuatable restraining device in a vehicle when said identifier means is determined to be present.

9. A method for sensing the presence of an object, said method comprising:

securing an identifier means to the object;

transmitting an electromagnetic signal;

providing an electromagnetic return signal from the identifier means in response to the transmitted electromagnetic signal, the electromagnetic return signal having a first frequency;

receiving the electromagnetic identifier return signal;

providing a signal at a second frequency, different from said first frequency;

mixing signals having the first frequency from said return signal and the second frequency to provide a beat signal having a beat frequency;

receiving the beat signal;

determining the presence of the identifier means when a predetermined beat frequency in the beat signal is present; and providing a signal indicative of the presence of the identifier means.

10. A method as set forth in claim 9, wherein the step of securing includes securing the identifier means to a child restraining seat.

11. The method of claim 9, wherein said step of determining includes the step of determining if said beat frequency is approximately equal to the difference between said first and second frequencies.

12. The method of claim 9, wherein said step of determining determines whether said beat frequency is equal to a predetermined frequency.

13. The method of claim 12, wherein said determining step further includes determining if said beat frequency exists for a predetermined time period.

14. An apparatus for sensing the presence of an object, said apparatus comprising:

signal means for providing a first electrical signal having a first frequency during a first time period and a second electrical signal having a second frequency during a second, different time period;

antenna means for transmitting an electromagnetic signal at the first frequency during the first time period in response to said first electrical signal and for providing an electrical return signal in response to a received electromagnetic return signal;

identifier means securable to the object for providing said electromagnetic return signal in response to said transmitted electromagnetic signal, said electromagnetic return signal continuing for a time duration past the termination of said transmitted electromagnetic signal;

combiner means for mixing said second electrical signal provided by said signal means and said electrical return signal to provide a beat signal having a beat frequency; and means coupled to receive said beat signal for determining the presence of said identifier means when a predetermined beat frequency is received for at least a predetermined duration after the termination of said transmitted electromagnetic signal and providing a signal indicative thereof.

15. An apparatus as set forth in claim 14 further including means to secure said identifier means to a child restraining seat.

16. An apparatus as set forth in claim 14 further including a band-pass filter for filtering said electrical return signal from said antenna means.

17. An apparatus as set forth in claim 14 further including a band-pass filter for filtering said beat signal from said combiner means.

18. An apparatus as set forth in claim 17, wherein said band-pass filter has a center pass frequency approximately equal to the difference between said first and second frequencies.

19. An apparatus as set forth in claim 14, wherein said means coupled to receive said beat signal includes a comparator for receiving said beat signal and providing a pulsing signal having a frequency equal to said beat frequency.

20. An apparatus as set forth in claim 19, wherein said means coupled to receive said beat signal further includes processor means for receiving said pulsing signal and determining the presence of said identifier means by counting the number of pulses.

* * * * *